T. C. DAVIS.
CHURN DASHER.
APPLICATION FILED SEPT. 7, 1916.

1,258,095.

Patented Mar. 5, 1918.

INVENTOR
Thomas C. Davis
BY
Hardaway & Cathey
ATTORNEYS

UNITED STATES PATENT OFFICE.

THOMAS C. DAVIS, OF NEW WAVERLY, TEXAS.

CHURN-DASHER.

1,258,095. Specification of Letters Patent. Patented Mar. 5, 1918.

Application filed September 7, 1916. Serial No. 118,803.

*To all whom it may concern:*

Be it known that I, THOMAS C. DAVIS, a citizen of the United States, residing at New Waverly, in the county of Walker and State of Texas, have invented certain new and useful Improvements in Churn-Dashers, of which the following is a specification.

This invention relates to new and useful improvements in churn dashers.

The object of the invention is to provide a dasher of the character described having a plurality of oppositely rotatable members by means of which the milk will be thoroughly agitated throughout its entire volume.

With the above and other objects in view the invention has particular relation to certain novel features of construction, operation and arrangement of parts, an example of which is given in this specification, illustrated in the accompanying drawings, wherein:—

Figures 1, 2, 3:
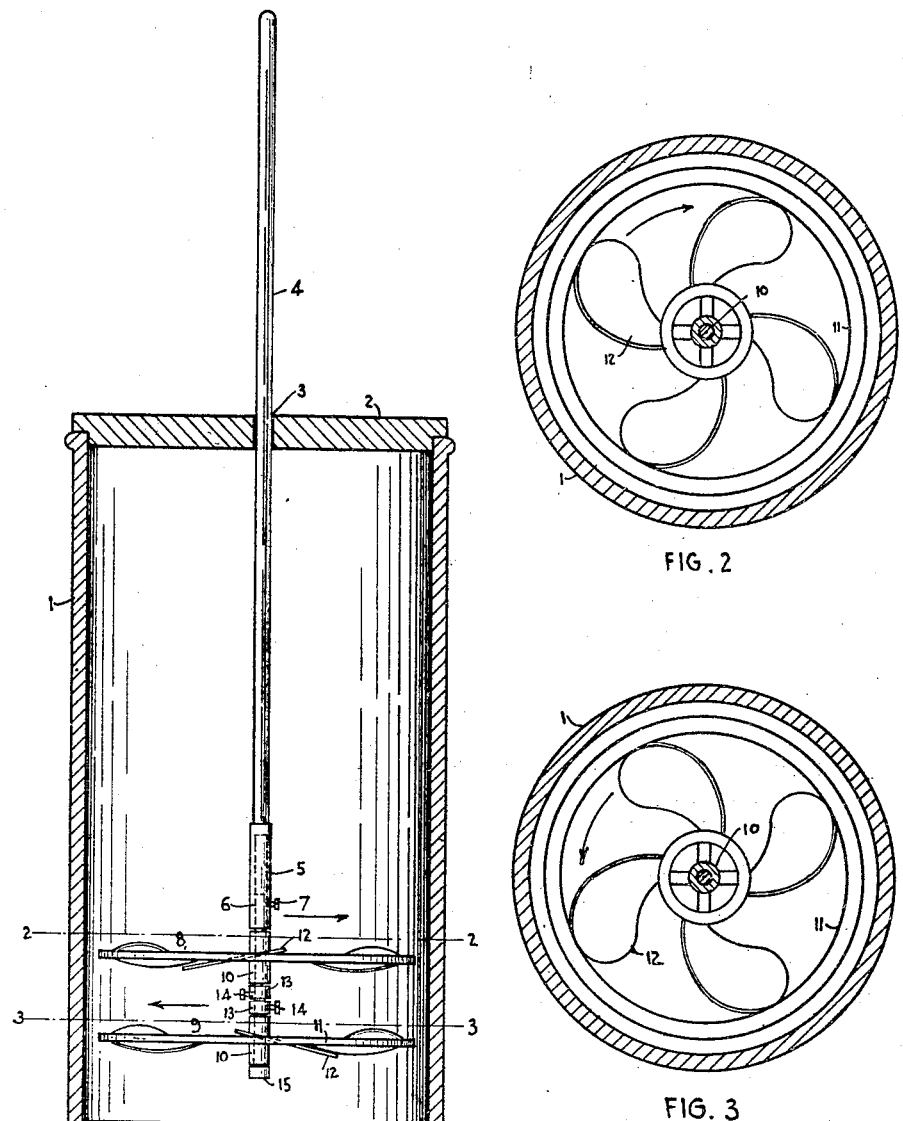
Figure 1 is a sectional side view of the churn with the dasher therein.
Fig. 2 is a horizontal sectional view thereof taken on the line 2—2 of Fig. 1.
Fig. 3 is a horizontal sectional view taken on the line 3—3 of Fig. 1.

Referring now more particularly to the drawing, the numeral 1 designates a churn having a top 2 with a central orifice 3 therein through which the staff 4 extends. The lower end of this staff is formed into a sleeve 5 which receives the upper end of the bearing pin 6 which is secured in said sleeve by means of the nut 7 which is threaded through said sleeve. Two dashers 8 and 9 are rotatably mounted upon the bearing pin. Each dasher is formed of a central hub 10, an annular rim 11 and a plurality of radiating vanes 12 secured at their respective ends to said hub 10 and rim 11. The vanes of the respective dashers are inclined, to the plane of rotation, in opposite directions so that as the dashers are moved up and down through the fluid, they will rotate in opposite directions. The dashers are spaced apart and between them on the pin 6 are the collars 13, 13, held in position by means of thumb nuts 14, 14, and the lower end of the pin 6 has an enlarged head 15 to hold the lower dasher on said pin. It is obvious that if the device is moved up and down through the fluid in the churn the dashers will rotate in opposite directions and thoroughly agitate said fluid. The bearing pin 6, which telescopes within the sleeve 5 may be adjusted so as to project a considerable distance from the free end of the sleeve and it is obvious that the upper dasher may be then adjusted a greater space from the lower one by a corresponding adjustment of the upper collar 13. This adjustment of the dashers toward and from each other is desirable so that the upper part of the volume of fluid will be thoroughly agitated as well as the lower, particularly when the churn is filled to the top.

What I claim is:

1. A device of the character described including a staff whose lower end is formed into a sleeve, a bearing pin telescoping within the sleeve and adjustable relative thereto, a pair of rotatable dashers mounted upon said pin and provided with oppositely inclined vanes and means for adjusting said dashers toward and from each other.

2. A device of the character described including a staff whose lower end is formed into a sleeve, a bearing pin whose upper end fits in said sleeve, means for securing said pin adjustably within the sleeve, a pair of dashers rotatably mounted on the bearing pin, each dasher being formed of a central hub, an annular rim and a plurality of radiating inclined vanes, the vanes of one dasher being inclined in a direction the opposite of that of the other dasher, an enlarged head carried by the lower end of the pin forming a bearing for the lower dasher, a pair of collars on said pin between the dashers and forming end bearings for the respective hubs thereof, said collars being adjustable on the pin so as to adjust the position of said dashers relative to each other on said pin and means for fixing said collars at any desired position on the pin.

In testimony whereof I have signed my name to this specification in the presence of two subscribing witnesses.

THOMAS C. DAVIS.

Witnesses:
 H. L. WELCH,
 L. J. GIZARA.

Copies of this patent may be obtained for five cents each, by addressing the "Commissioner of Patents, Washington, D. C."